United States Patent
Vasudevan et al.

(10) Patent No.: US 8,578,432 B2
(45) Date of Patent: Nov. 5, 2013

(54) POLICY CONTROL OVER SWITCHED DELIVERY NETWORKS

(75) Inventors: Swaminatha Vasudevan, Palo Alto, CA (US); Xiaomei Liu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 578 days.

(21) Appl. No.: 11/952,969

(22) Filed: Dec. 7, 2007

(65) Prior Publication Data

US 2009/0150943 A1 Jun. 11, 2009

(51) Int. Cl.
*H04N 7/173* (2011.01)
*H04H 20/28* (2008.01)
*H04N 7/16* (2011.01)

(52) U.S. Cl.
USPC ............. 725/95; 725/119; 725/146; 725/148; 370/486

(58) Field of Classification Search
None
See application file for complete search history.

(56) References Cited

U.S. PATENT DOCUMENTS

| | | | |
|---|---|---|---|
| 6,477,169 B1 | 11/2002 | Angle et al. | |
| 6,704,576 B1 | 3/2004 | Brachman | |
| 7,245,614 B1 * | 7/2007 | Podar et al. | 370/389 |
| 2004/0158870 A1 * | 8/2004 | Paxton et al. | 725/115 |
| 2005/0053094 A1 | 3/2005 | Cain | |
| 2006/0161625 A1 * | 7/2006 | Norp et al. | 709/206 |
| 2006/0268697 A1 * | 11/2006 | Oz et al. | 370/229 |
| 2007/0107025 A1 * | 5/2007 | Li et al. | 725/97 |
| 2007/0113246 A1 * | 5/2007 | Xiong | 725/39 |
| 2007/0177632 A1 * | 8/2007 | Oz et al. | 370/486 |
| 2008/0201748 A1 * | 8/2008 | Hasek et al. | 725/98 |
| 2009/0031384 A1 * | 1/2009 | Brooks et al. | 725/127 |
| 2009/0100459 A1 * | 4/2009 | Riedl et al. | 725/35 |
| 2009/0168679 A1 * | 7/2009 | Benjamim et al. | 370/312 |

OTHER PUBLICATIONS

The Notification of Transmittal of the International Search report and the Written Opinion of the International Searching Authority, or the Declaration for PCT Application No. PCT/US08/085336 mailed May 18, 2009.

* cited by examiner

*Primary Examiner* — Chris Parry
(74) *Attorney, Agent, or Firm* — Weaver Austin Villeneuve & Sampson LLP

(57) ABSTRACT

A method is described that includes receiving a program request from a transceiver that includes a program request to receive a video program at the transceiver. The method also includes determining an amount of bandwidth on a channel available to the transceiver. The method further includes determining whether to provide a unicast stream or a multicast stream to deliver the requested video program to the transceiver in response to the program request based on a result obtained after implementing a policy control function that considers an amount of bandwidth on the channel to the transceiver. The method further includes formatting and selecting an incoming media stream in accordance with the result of the policy control function to provide a corresponding formatted unicast or multicast media stream that includes video data for the requested video program. The method further includes outputting the associated formatted unicast or multicast media stream on the channel.

30 Claims, 4 Drawing Sheets

POLICY CONTROL OVER SWITCHED DELIVERY NETWORKS

TECHNICAL FIELD

The present disclosure relates generally to media delivery, and more particularly to dynamically switching between multicast and unicast media delivery.

BACKGROUND

Typically, service providers deliver media streams including video data in one of three forms: broadcast, multicast or unicast. According to the traditional broadcast model, a provider sends the same video content to all transceivers serviced by the provider. In a multicast system, a provider sends the same multicast stream to a service group, a subset of subscribers that are commonly served by a network node or group of nodes. All subscribers in the service group viewing the same multicast program receive and share the same multicast video stream. In contrast to broadcast stream delivery, multicast stream delivery offers a limited opportunity for content stream alteration at the service group level. For example, advertisements sent to subscribers of a service group sharing a multicast stream can be catered to a demographic profile of the subscribers in the service group. In a unicast system, a provider sends a separate unicast stream to each single subscriber endpoint (e.g., a transceiver such as a set-top box (STB)). Every unicast stream sent to a subscriber is unique; that is, even if different subscribers are viewing the same program, each subscriber receives and decodes a separate unicast video stream, thus significantly increasing the total bandwidth required to transmit the video program to all unicast subscribers relative to broadcast and multicast delivery methods. However, unicast stream delivery offers an opportunity for video stream content personalization on an individual subscriber level.

Switched digital video is a network scheme for distributing digital video via a network channel having limited bandwidth capacity. The term switched digital video applies to digital video distribution on typical cable television systems using quadrature amplitude modulation as well as to systems utilizing Internet Protocol. The initiative behind switched digital video is that video service providers do not send unwatched programs over the network, thus permitting a more efficient use of bandwidth.

BRIEF DESCRIPTION OF THE DRAWINGS

The present invention is illustrated by way of example, and not by way of limitation, in the figures of the accompanying drawings and in which like reference numerals refer to similar elements.

DESCRIPTION OF EXAMPLE EMBODIMENTS

Overview

Figure 1:
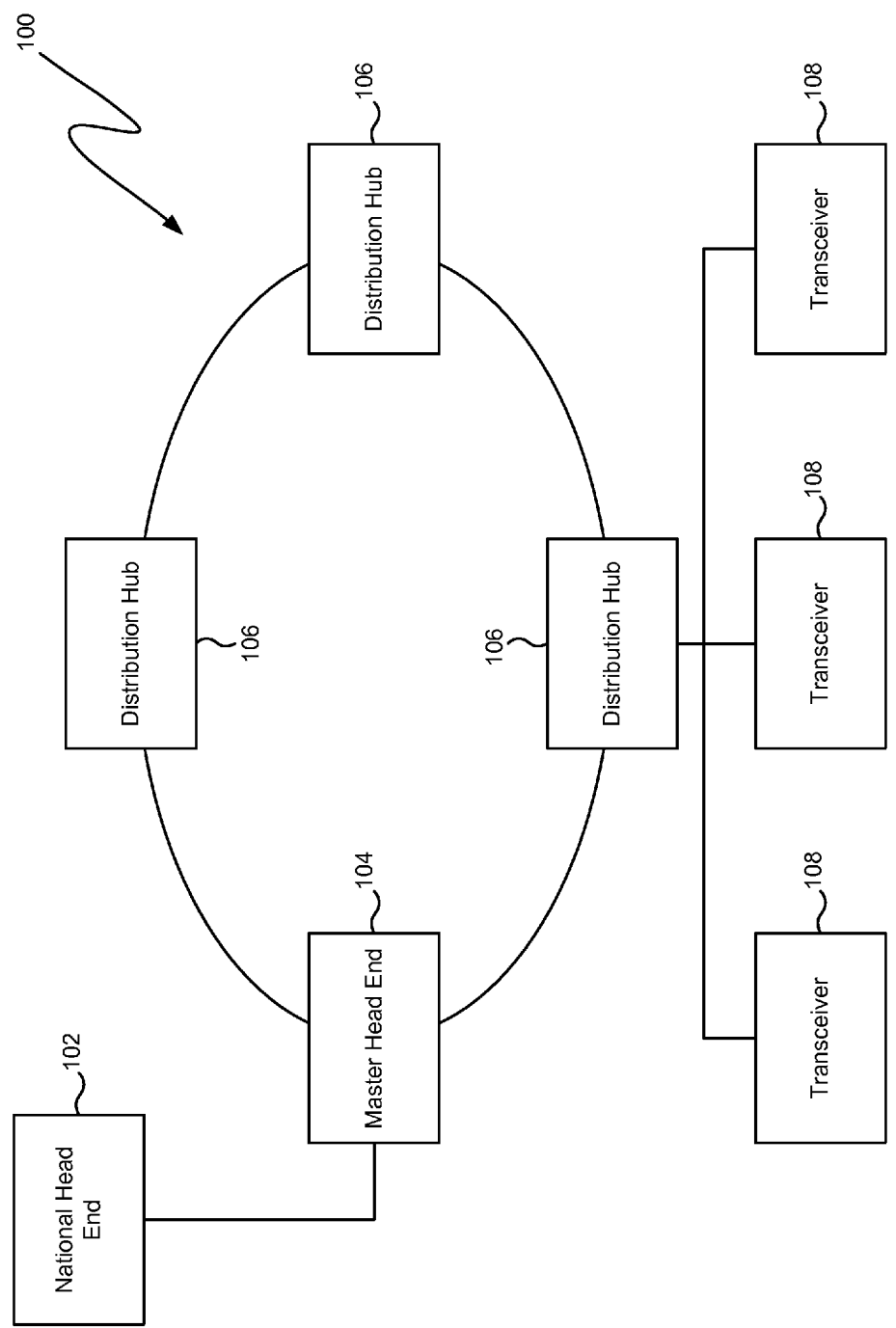
FIG. 1 illustrates an example network system for transmitting media streams in accordance with particular embodiments.

In one embodiment, a method is described that includes receiving a program request from a transceiver to receive a video program at the transceiver. The method also includes ascertaining an amount of bandwidth on a channel available to the transceiver. The method further includes determining whether to provide a unicast stream or a multicast stream to deliver the requested video program to the transceiver in response to the program request based on a result obtained after implementing a policy control function that considers at least an amount of bandwidth on the channel available to the transceiver. The method may further include formatting an incoming media stream in accordance with the result of the policy control function to provide a corresponding formatted unicast or multicast media stream that includes video data for the requested video program. The method may further include outputting the associated formatted unicast or multicast media stream on the channel.

In another embodiment, an apparatus is described that includes a first network interface configured to receive an incoming media stream that includes video data for a video program. The apparatus also includes at least one processor configured to execute instructions encoded in one or more tangible media for execution. When executed, the logic is operable to examine a program request received from a transceiver. The logic is also operable to determine an amount of bandwidth on a channel available to the transceiver. The logic is further operable to determine whether to provide a unicast stream or a multicast stream to deliver the requested video program to the transceiver in response to the program request based on a result obtained after implementing a policy control function that considers the amount of bandwidth on the channel available to the transceiver. The logic may be further operable to format the incoming media stream in accordance with the result of the policy control function to provide a corresponding formatted unicast or multicast media stream that includes video data for the video program. The apparatus may further include one or more network interfaces configured to receive the program request from the transceiver over the channel and output the associated formatted unicast or multicast media stream on the channel.

In still another embodiment, logic encoded in one or more tangible media for execution is described. When executed, the logic is operable to receive a program request from a transceiver. The logic is also operable to determine an amount of bandwidth on a channel available to the transceiver. The logic is further operable to determine whether to provide a unicast stream or a multicast stream to deliver the requested video program to the transceiver in response to the program request based on a result obtained after implementing a policy control function that considers the amount of bandwidth on the channel available to the transceiver. The logic may be further operable to format an incoming media stream in accordance with the result of the policy control function to provide a corresponding formatted unicast or multicast media stream that includes video data for the requested video program. The logic may be further operable to output the associated formatted unicast or multicast media stream on the channel.

Example Embodiments

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Systems and methods for providing media data, and particularly video data, are described. The systems and methods may dynamically switch between broadcast, multicast and unicast video delivery on a switched video network to utilize bandwidth more efficiently while increasing the level of video content personalization to viewers. Such systems and methods offer a balance between aggregate stream personalization and network resource utilization by dynamically controlling the aggregate population of broadcast, multicast and unicast streams as a function of active stream bandwidth utilization, business rules, subscriber demographics, and/or subscriber capabilities and preferences, among other factors. This improves both content stream personalization and bandwidth efficiency.

The following description provides a framework for implementing policy controls that govern network resource usage. Particular embodiments provide media service providers with tools to better allocate resources to broadcast, multicast and unicast video streams to efficiently use bandwidth and other network resources while better fitting one or more business needs. For example, cable providers can have increased control over customer service differentiation, the potential for increased service related revenue, and greater ability to increase the level of service to viewers.

As the term is used herein, a program (or video program) refers to decoded video, and may include any decoded video content such as a television show, movie, pay-per-view event, etc.

While the following description focuses on cable distribution networks, and particularly to providing switched digital video streams to subscribers via cable networks, it will be apparent to those of skill in the art that particular embodiments described herein are applicable to a wide variety of other data distribution networks. For example, the following description is applicable to Digital Subscriber Line (DSL) networks or wireless networks, among others, with appropriate variations.

As previously mentioned, service providers deliver media streams including video data in one of three forms: broadcast, multicast or unicast. A provider sends broadcast streams to every subscriber serviced by the provider. Broadcast stream delivery is generally the most bandwidth efficient when a large majority of subscribers (also referred to herein as "viewers") receive the same program. However, as the number of programs offered at any given time increases, broadcast stream delivery becomes less bandwidth efficient since is no discrimination or discretion practiced in distributing the video streams. Broadcast video streams are the same for all subscribers. As a result, broadcast stream delivery offers no opportunity for content personalization whether on an individual or a group basis.

According to multicast protocol, a service provider sends multicast video streams to subscribers within a service group, which is a set of all subscribers served by a network node or group of nodes. Subscribers in the service group viewing a multicast program receive and share the same video stream. Multicast stream delivery is relatively more bandwidth efficient when a small majority of subscribers view a common set of programs or video streams. In contrast to broadcast stream delivery, multicast stream delivery offers a limited opportunity for content personalization at the service group level. For example, advertisements, when sent to subscribers of a service group sharing a multicast stream, can be catered to a demographic profile of subscribers in that service group.

According to unicast protocol, a service provider sends a separate unicast stream to each single subscriber endpoint (e.g., a transceiver such as a set-top box (STB)). Unicast stream delivery is generally the least bandwidth efficient of the aforementioned media delivery techniques. Each unicast stream is unique; that is, even if different subscribers are viewing the same program, each subscriber receives a separate video stream, thus increasing the bandwidth required to transmit the video program to the unicast subscribers relative to broadcast and multicast delivery methods. However, unicast stream delivery offers an opportunity for video stream content personalization on an individual subscriber level. In other words, unicast delivery enables video content, including advertisements, and delivery to be tailored for a single subscriber. The personalization may be based in part on information used to characterize the subscriber. A subscriber's STB provides one source of information for the subscriber. Such information may include the subscriber's general demographic profile and/or personal information including a person's age, current residence, favorite TV show, favorite actor, favorite movie, preferred movie genres (e.g., horror, comedy, etc.), preferred sport, historical viewing information, favorite sports team, hobbies and interests (e.g., hunting or cooking), preferred vacation destination, education level, annual income, sex (M/F), occupation, marital status, and/or number of children, for example. An example of a unicast service is Video on Demand (VOD). Generally, conventional VOD systems either stream content for virtually real time viewing or download the content to an STB in its entirety before viewing begins.

An illustrative network will now be briefly described to provide context for network video delivery. FIG. 1 illustrates a video network 100 capable of delivering switched digital video (SDV) in accordance with particular embodiments. In the illustrated embodiment, a national head end 102 transmits broadcast media streams including video and other data streams to a master head end 104. The master head end 104 generally includes one or more satellite dishes for reception of media streams from the national head end 102. The master head end 104 may also receive media streams via other media and from other sources other than the national head end 102. The master head end 104 receives broadcast streams from the national head end 102 and formats the streams. In one embodiment, the master head end 104 is capable of reformatting the media streams and combining/recombining the streams for output to a number of distribution hubs 106. For example, each distribution hub 106 may be a local head end such as a central office. In some network systems, a local head end services a local geographic service area of a cable network. In following description, for ease of discussion, distribution hub and local head end are used interchangeably. In an alternate embodiment, the master head end 104 distributes the media streams to one or more regional head ends that, in turn, transmit the streams to local head ends 106. The local head ends 106 distribute the streams to receivers/transceivers 108 at subscriber endpoints such as STBs in the homes of subscribers. In another embodiment, the transceivers 108 are quadrature amplitude modulation (QAM) tuners in communication with or built into associated TVs or other displays. In another specific embodiment, the transceivers 108 are STBs with embedded cable modems. In the following description, references to STBs generally refer to any node or transceiver at a subscriber endpoint capable of receiving and decoding an incoming stream.

Network 100 uses a suitable compression scheme to reduce the bandwidth required to transmit the video information. For example, many STBs in cable networks use an MPEG (Moving Picture Experts Group) codec such as the MPEG-2 codec. An increasing number of STBs are using MPEG-4. MPEG-4 coding is roughly twice as efficient as MPEG-2; that is, a stream coded according to MPEG-4 compression occupies roughly half of the bandwidth needed by a stream coded according to MPEG-2 compression. It should be appreciated that other compression schemes are also suitable for use herein.

Local head end 106 generally includes one or more routers and/or servers. For example, the servers may store video for VOD or advertisements. In one embodiment, each cable head end 106 includes a Quadrature Amplitude Modulator (QAM). The QAM uses quadrature amplitude modulation to modulate the information from incoming streams to use the available bandwidth on the network 100 more efficiently. Transporting digital video content using MPEG coding and QAM modulation significantly increases the channel carrying capacity of the network.

In another embodiment, video network 100 uses Internet Protocol (IP) to transmit the media streams. The use of IP to deliver video streams to the transceivers 108 of subscribers is commonly referred to as IPTV. In still another embodiment, IP transmits video and other streams to the local head end 106 where the streams are then modulated according to QAM.

Video network 100 is suitable for real-time transmission of video data to a transceiver 108 at a subscriber endpoint. In this case, local head end 106 delivers video content to different end transceivers 108 in real-time. Additionally, in various embodiments, head end 106 inserts local video content, such as advertisements, in real-time before receipt by the target transceivers 108.

In the following description, references are made to upstream and downstream delivery. Downstream signals generally carry video content, voice and internet data towards a transceiver 108, i.e., from a local head end 106 to a transceiver. Upstream signals generally carry information such as STB control signals, cable modem data and voice away from a transceiver 108, i.e., from a transceiver to a head end 106.

In one particular embodiment, the switched video network 100 includes a hybrid fiber-coaxial (HFC) network. HFC networks generally carry a variety of services including analog TV, switched digital video, digital TV including both standard definition (SD) and high definition (HD) TV, video on demand (VOD), telephony and high-speed internet data, and control signals and other information sent from, for example, a transceiver 108 to a head end 106.

In a typical HFC network, signals are carried predominantly by optical fiber up until the "last mile," whereby the signals are carried via coax. The fiber optic portion of the HFC network may extend from the master head end 104 to regional head ends, to local head ends and distribution hubs 106 and ultimately to fiber optic nodes. Each fiber optic node generally serves a large number of subscriber endpoints, such as the homes of subscribers. For example, a single fiber optic node may serve in the range of approximately 500 to 2000 homes. The fiber optic node includes both a broadband optical transmitter and a transceiver. The fiber optic node is capable of converting the optically modulated signal sent downstream from a head end to an electrical signal that is then transmitted downstream to transceivers 108. Additionally, the fiber optic node is capable of the reverse; that is, receiving an electrical signal sent upstream from a transceiver 108 and converting the received electrical signal into an optically modulated signal that is then transmitted upstream to a head end. Generally, in an HFC network, the last leg of the signal path, that between the optical node and subscriber (often referred to as the "last mile"), is coax cable. In other embodiments, optical fiber is used to deliver video streams "to the curb," known as Fiber to the Curb (FTTC), or "to the premises," known as Fiber to the Premises (FTTP). FTTP includes Fiber to the Home (FTTH).

Switched video (also referred to herein as switched digital video or SDV) is a network scheme for distributing digital video via a channel having limited bandwidth capacity. The term SDV applies to digital video distribution on typical cable TV systems using QAM channels as well as to IPTV systems and still other systems. The initiative behind SDV is that service providers do not need to send unwatched programs over the network to subscribers, thus permitting a more efficient use of bandwidth. For example, an STB 108 in a home sends a channel request signal back to the associated local head end 106. The local head end 106 then switches (sends) the desired program to the STB 108 and/or provides tuning information so that the STB can tune to the desired program. In this way, service providers only distribute video streams associated with programs that have been requested.

There are two main implementations of SDV, switched multicast and switched unicast. Conventional SDV systems are purely multicast, and are not capable of dynamically switching between unicast and multicast. Currently, purely unicast systems are impractical as channel capacities are insufficient to provide the bandwidth required to support a purely unicast system in which all subscribers will receive their own unicast streams. Some conventional systems can send select unicast streams such as VOD services when a subscriber requests a VOD program. It should be noted that VOD programs are not broadcast or multicast. However, the viewership of switched video is generally much higher than for VOD. This then requires much more bandwidth to support a unicast delivery of switched video, which is not economically prudent today.

It should be noted that the channel numbers displayed on a TV do not correspond with particular frequencies. In other words, video programs on a given TV channel may be sent on different frequencies at different times or to different viewers.

Switched video network 100 dynamically switches between broadcast, multicast and unicast media delivery to utilize bandwidth more efficiently while increasing the level of content personalization to subscribers.

In a switched multicast video network, a head end transmits a multicast video stream to all of the transceivers in the same service group. All viewers in a particular service group tuning to the same program access the same physical multicast video stream. There is thus a limited opportunity for viewership data extraction with multicast delivery at the service group level.

In a switched unicast video network, a head end sends a unique unicast video stream to each viewer. Thus, while viewers are able to tune to the same video program, each viewer receives a unique video stream at his transceiver. Since unicast protocols send a separate copy of the media stream from the local head end to each transceiver and associated subscriber viewing a video program, a massive duplication of data occurs on the network, which absorbs a significant portion of the total bandwidth available on the network. However, switched unicast saves bandwidth relative to traditional broadcast when the number of program channels offered at any one time exceeds the number of active viewers in a given service group.

Unicast stream delivery offers video stream content personalization at the subscriber level. Since the connection relationship between the local head end and subscriber is explicit and unique, a system capable of unicast delivery enables the delivery of non-linear (stored) content as well as linear (live-feed) content in a seamless fashion, and also allows a stream to be dynamically modified as a result of interactive subscriber input. As such, unicast stream delivery offers the greatest amount of personalization, as well as more opportunities for providers to deliver a more enhanced service experience. It allows for individual subscriber content personalization, targeted advertising and precise individual viewership data extraction. However, unicast delivery systems generally require more capital resources for switching infrastructure and quadrature amplitude modulation.

The dynamic switching may implement a variety of bandwidth allocation and content personalization schemes. In various embodiments, it is assumed that a number of broadcast streams are ever-present on the network 100. In other embodiments, switched video network 100 may only transmit multicast and unicast streams.

The decision whether to switch a multicast stream or a unicast stream to a subscriber may be made upon receipt of a program request (also referred to herein as a video program request or channel request) transmitted to the head end from the subscriber's transceiver. Switching decisions may also be made on a temporal or periodic basis at the head end.

Figure 2:
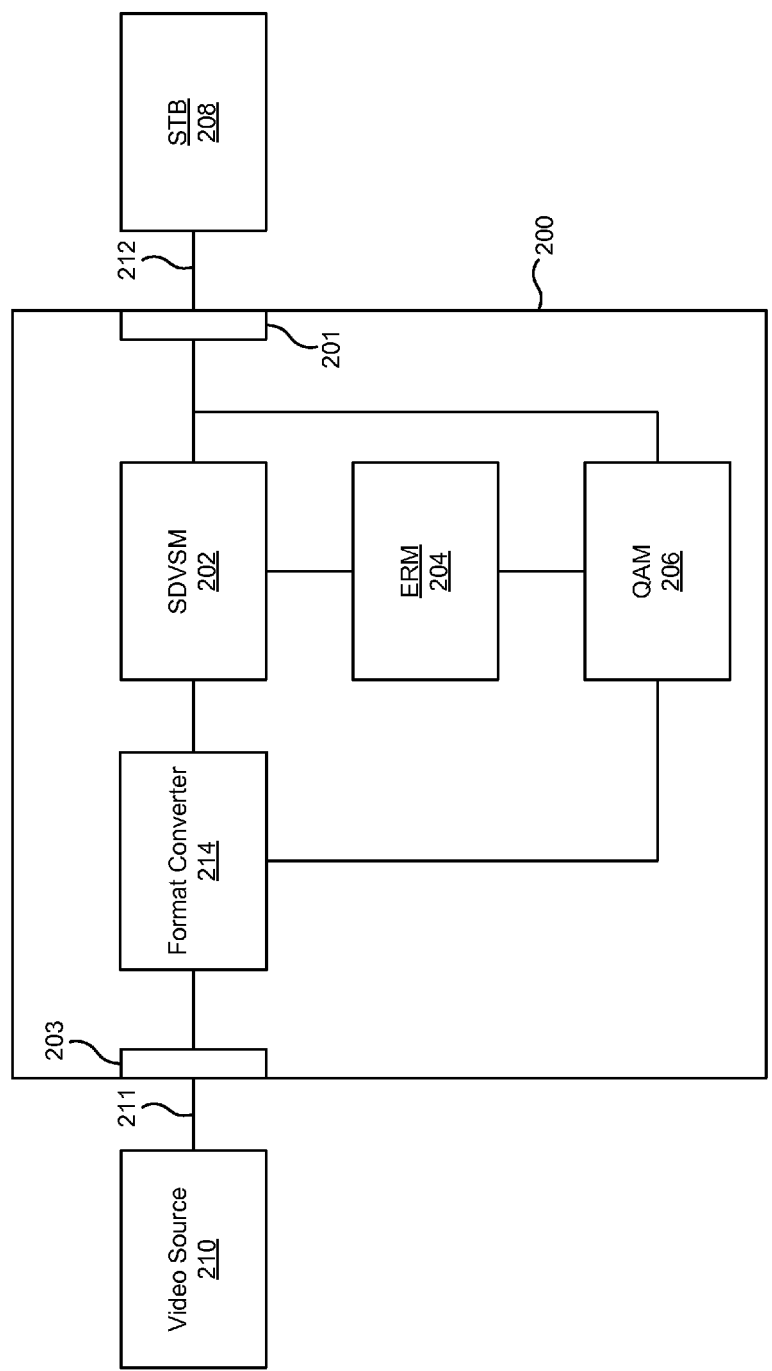
FIG. 2 illustrates an example network device in accordance with particular embodiments.

FIG. 2 illustrates a network device 200 having one or more processors suitable for use in dynamically switching between broadcast, multicast and unicast delivery over switched video network 100 in real time on an individual subscriber basis according to various embodiments. In one particular embodiment, network device 200 is located at a local head end or other distribution hub. While the network device 200 will now be described as an apparatus composed of units, those skilled in the area will recognize that the following description encompasses a method, process or software having as steps the actions performed by each unit and described below. It will also be recognized that network device 200 may comprise a number of separate network devices that communicate with one another. In a specific embodiment, network device 200 includes a router or other network node configured to transmit bitstreams, such as those sold by Cisco Technology Inc. of San Jose, Calif. Other network nodes are suitable for use.

Network device 200 receives channel requests and other data from STBs or other transceivers 208 via a channel 212 through a network interface 201. Network device 200 has a plurality of inputs and outputs included in network interface 201, which performs any network layer functions to receive and output data. Network device 200 allocates resources to deliver the desired video programs in suitable formats via broadcast, multicast or unicast bitstreams through interface 201 and over channel 212 to the respective transceivers 208. In another embodiment, network device 200 delivers the desired video programs via a second downstream interface separate from network interface 201.

Network device 200 also communicates with a number of video sources 210 via an upstream network interface 203. The video sources 210 may include non-storage based sources such as linear television feeds, received in the form of compressed video bitstreams that may be transmitted from a master head end or regional head end, as well as storage based video such as that stored on a server located at the local head end. Network device 200 is configured to directly or indirectly receive bitstreams from the video sources at upstream network interface 203. Although, only a single video source 210 and a single input line 211 are shown, it will be understood that network device 200 may receive compressed data from a plurality of sources and over a plurality of input lines. As such, network device 200 has a plurality of inputs included in network interface 203, which performs any network layer functions to receive bitstreams. Additionally, the compressed data transmitted over input line 211 may include a plurality of compressed data signals multiplexed together into a single compressed data stream.

In the illustrated embodiment, Network device 200 includes a Switched Digital Video Session Manager (SDVSM) 202, an Edge Resource Manager (ERM) 204, a QAM 206 and a format converter 214. The SDVSM 202 receives channel requests and switches the appropriate streams to the associated transceivers 208. The ERM 204 manages the QAM resources for multiple services including, for example, SDV and VOD, among others. In one particular embodiment, QAM 206 receives video IP streams and delivers the video streams to the transceivers 208 using QAM modulation. The format converter 214 receives compressed video data having a first compressed video data format from video source 210 through interface 203 and may alter and output the compressed video data such that the data has a second compressed video data format. In the illustrated embodiment, the output of the format converter 214 is provided to both the SDVSM 202 and the QAM 206.

The altering performed by the format converter 214 may take the form of transcoding, including transrating or changing (usually reducing) the bitrate while keeping the same codec type. In some cases, the format converter 214 may alter the bit rate of the transmission bitstream based on the bit rate capacity of the channel 212 between the network device 200 and the target transceiver 208. Bit rate conversion of a compressed video bitstream refers to the process performed on a modified compressed video bitstream that results in a different transmission bit rate than the originally compressed bitstream. By way of example, the bit rate converter can perform conversion by adjusting or modifying the encoded bit stream syntax such as for the VLC decoding, the de-quantization, the inverse transform coding or the motion compensation. Alternatively, the format or codec of the video data may also be changed, for example, from MPEG-2 to MPEG-4. The format converter 214 may be tailored to decoding and encoding according to a specific compression format. In an MPEG specific embodiment, the format converter 214 performs DCT, motion residual calculation via motion compensation, variable length coding of all the bits, and then outputs a compressed MPEG bitstream. In this case, the format converter 214 may also include other format specific processing components such as a bitstream multiplexer and transport multiplexer for rebuilding the MPEG-2 bitstream after format conversion. In another specific embodiment, format conversion requires complete decoding and re-encoding processes for a given format, which may be performed by ASIC hardware. Additionally, the underlying resolution of the compressed video may also be converted during the transcoding operation. Bit rate conversion of a compressed video bitstream is further described in commonly owned co-pending U.S. Patent Application entitled "A System and Method for Transporting Compressed Video and Data Bit Stream Over a Communication Channel" by Ji Zhang et al., filed on Oct. 10, 1997 (U.S. application Ser. No. 08/947,480), which is incorporated by reference herein.

Even though a compressed bitstream typically comprises a combination, called a multiplex, of compressed audio, video and auxiliary data bitstreams, the format conversion processes described herein primarily refer to procedures applied on compressed video data. Although not detailed, it is understood that any compressed audio and auxiliary data, such as compressed audio and auxiliary data related to the output of the compressed video data, may also be converted.

In one embodiment, the format converter may be pre-configured to generate multiple copies of the stream in several different formats. The SDVSM may then choose the most appropriate format. In a second embodiment, the SDVSM may instruct the format converter to output a stream having a particular format or to otherwise modify the stream. The particular compression format sent to the transceiver 208 may be determined by a control signal from the corresponding transceiver 208. In one embodiment, the format to be used is determined by the target transceiver 208 and communicated to the SDVSM 202, either through knowledge of the static decompression capabilities of the target transceiver decoder or through an initiation handshake. The SDVSM 202 may instruct the QAM 206 as to which format to use via the ERM 204. The SDVSM 202 also instructs the transceiver which stream format to select and decode from the output interface 201.

Network device 200 is well-suited for use in media delivery applications that use digital program insertion. In various embodiments, network device 200 includes, or is in communication with, a splicer or other apparatus configured to insert local advertisements into video streams received by network device 200. In this case, network device 200 outputs bitstreams in which pre-compressed segments of digital video and/or audio bitstreams, such as local advertisement content, replace segments of an ongoing video and/or audio program, such as a network feed. For example, a digital insertion location in a network feed may include network default advertisements.

A channel request may initiate the stream delivery selection process. The STB 208 sends channel requests and other subscriber information upstream along channel 212 to an associated SDVSM 202 and receive channel (i.e., video program) tuning information. For example, a viewer may indicate such a channel request via a remote or the pushing of a button on an STB 208 (or on the TV, if the TV has a built in tuner). A channel request may also be sent automatically upon turning on the STB 208. Channel tuning information includes frequency and program number information that the STB 208 uses to find and decode the desired program. As described above, the network device 200 generally serves a large number of STBs and other transceivers 208, and a large number of STBs 208 may send and receive video streams and other information through channel 212 at any give time.

Upon receiving a channel request from an STB 208, the SDVSM 202 requests QAM resources from the ERM 204. The ERM 204 allocates the best QAM resource for this request and binds QAM resources for the channel request. The SDVSM 202 then commands the QAM 206 to send the channel tuning information back to the requesting STB 208 along with a video stream carrying the requested program. According to various embodiments, SDVSM 202 only allots bandwidth to video programs for which at least one channel request has been received. In other embodiments, a number of broadcast streams are allotted bandwidth on the channel 212 as well. Additionally, the SDVSM may also reclaim programs that are no longer being watched.

Network device 200 implements policy controls to determine the type (i.e., broadcast, multicast or unicast) of stream sent to the STB 208. The policy controls determine whether to allocate network resources (i.e., bandwidth on channel 212) to broadcast, multicast or unicast streams to serve the channel requests sent by the STBs 208. In additional embodiments, the policy controls are also used to determine the format of the program offering (i.e., HD versus SD as well as the encoding type). The policy controls refer to a policy control function (or functions) implemented with network device 200. In one particular embodiment, the policy controls are located within a policy control server included within the architecture of the SDVSM 202 and/or the ERM 204. In another embodiment, the policy control server is an external device in communication with the SDVSM 202 and the ERM 204 via a network.

In one embodiment, the policy control uses multiple variables to determine the type of stream sent to an STB 208 making a channel request. Suitable variables may include: the current bandwidth available on the network through channel 212, the percentage of bandwidth allocated to switched unicast and multicast streams, the percentage of the bandwidth allocated solely to unicast streams, the number of other subscribers receiving the desired program, the number of transceivers 208 in the service group served by the network device 200 at the local head end, the demographic profile of the subscriber initiating the program request, the level of income of the subscriber, the programs generally viewed by the subscriber, the current program requested by the subscriber, the popularity of the program requested by the subscriber, the format (e.g., HD or SD) of the program requested by the subscriber, the available formats of the program requested by the subscriber, the codec capabilities of the subscriber's transceiver 208, and/or the time of day and the day of the week, among others. These variables and their role in the policy control are described in more detail below. As one of skill in the art will appreciate, the number and types of variables used in the policy control function may vary and grow in time. As such, the policies and associated variables described in the following description of particular embodiments are not meant to be limiting. The policies and variables chosen may depend on a service provider's business needs for example. Additionally, as different policies or rules produce different results (i.e., different modes of delivery to STBs in the network), weights may be assigned to each policy rule or variable to generate a final decision. In one embodiment, some or all of these weights vary dynamically. For example, the weights may vary based upon the current network bandwidth usage.

In several embodiments, the policy control contemplates bandwidth. Service providers usually over provision their networks to prevent service disruption. With the coexistence of the switched multicast and switched unicast, the SDVSM 202 can determine in real time which method of transmission to use based (at least in part) on the current network bandwidth usage. The bandwidth cost measure may be a function of one or more of: the bandwidth unit cost (e.g., dollars/Mbps), a service group size (e.g., tuners per service group), a bandwidth cost measure that takes into account channel bandwidth options (e.g., HD versus SD version bandwidth and MPEG version (or other codec) bandwidth), and channel popularity. For example, channel popularity may be used to set an upper bound bandwidth of all users tuning to that channel. This is effective when a large number of viewers are viewing the same program. Channel popularity may also determine the cost difference between a video program delivered as unicast versus multicast. Current network utilization also factors into the bandwidth cost measure. In one embodiment, the current network utilization is assessed both as a total percentage of the total service group capacity as well as a switched bandwidth percentage (i.e., bandwidth allocated to unicast and/or multicast streams) of the total service group capacity. When the network is more utilized, the cost of adding a unicast stream increases (i.e., weighted more) in an accelerated fashion to favor multicast delivery instead. Similarly, in some embodiments when network utilization is high, SD versions of programs are chosen over HD versions to reduce bandwidth requirements.

Network device 200 may receive policy control information from one or multiple sources. When a subscriber makes a request to tune to a desired channel, network device 200 receives information associated with some or all of the aforementioned variables from the STB 208. Additionally, when an STB logs on to the system (turns on) it typically sends a registration message that can include information such as the STB address, the STB decoding capabilities, demographic information, etc. Since a subscriber's STB 208 is generally issued by the cable service provider, the service provider is able to identify the geographic location of the STB based on STB identifying information sent from the STB to the network device 200, such as the STB's address and the service group address. In particular embodiments, network device 200 is in communication with one or more databases that provide the geographic location of the STB 208 as well as other information about the associated subscriber. Additionally, to filter useful information and increase efficiency, network device 200 may be in communication with a data miner. The data miner provide content such as advertisements that are catered to a target subscriber (using unicast delivery) or to a group of subscribers (using multicast delivery) using policy controls in conjunction with some or all of these variables and others. In general, the level of content personalization, including targeted advertising, increases with the number of variables used in the policy control function.

In a specific embodiment, the primary drivers in the policy control decision process are: a) bandwidth requirements (i.e., the bandwidth available on the channel 212, the bandwidth on the channel allocated to unicast streams, and/or the bandwidth required by the desired video program), and b) the desire to increase targeted advertising to subscribers. In general, advertisers pay more for targeted advertising that reaches an intended demographic. With multicast stream delivery, advertisers can cater advertisements to a target demographic of subscribers represented in a single service group. With unicast stream delivery, service providers can personalize individual subscriber content. Thus, in one particular embodiment, the policy control blends unicast and multicast switching such that bandwidth is used to its fullest while providing as many unicast streams as possible.

Not all streams benefit from unicast personalization. In some instances, a service provider is not allowed to insert advertisements within certain video programs. Many programs, such as an HBO movie, do not include any advertisements opportunities. Some networks (e.g., ABC, NBC, CBS) also do not permit targeted advertisement insertion. When restricted from doing so, the service provider does not send these programs via unicast.

According to some embodiments, the SDVSM 202 and ERM 204 implement a policy control that considers the relative provision of the different stream types. First, the SDVSM 202 will decide the stream format (e.g. MPEG2 or MPEG4 part 10) and the stream type (multicast or unicast) based on factors such as STB capability, user profile, channel identification, service group statistics etc. Then the ERM 204 may apply policy control to determine whether or not a channel request should be granted, and furthermore. ERM 204 policies may limit a maximum amount of unicast bandwidth allotted on channel 212. To do so, the bandwidth allocated to unicast streams may be compared to a threshold, such as a maximum bandwidth allotted to unicast video. In one particular embodiment, a maximum bandwidth allotted to unicast video streams ranges from approximately 40 percent to approximately 60 percent of the total bandwidth pool. For example, a maximum bandwidth of approximately 70 percent of the total bandwidth pool is suitable in some instances. This threshold may also vary dynamically. Factors that affect the dynamic maximum unicast bandwidth include: the current bandwidth available on the channel, the level of activity of subscribers (i.e., measured by the rate at which channel requests are made), the day of week, time of day, among others. Often, there is a higher maximum bandwidth threshold in the afternoon and a lower threshold in the evening when more subscribers view programs. Additionally, there may be a lower threshold at every hour or half hour when more channel requests are made as various video programs end and begin. In a specific embodiment, the threshold is determined via a look-up table accessed by network device 200.

As an example, assume that a cable service provider desires to offer 1000 video programs, and assume that the provider only has a channel bandwidth capacity for 100 video streams. Policy control as described above then sets a threshold for the maximum amount of bandwidth allocated to unicast streams. After this threshold is reached, each additional requester for a video program that is currently being viewed by another subscriber is switched a multicast stream (or broadcast stream) shared with other subscribers watching that video program.

However, in certain instances, even if many subscribers or even a majority of subscribers within a service group desire to view the same program, they may not all be switched a multicast stream. Instead, a service provider can switch unicast streams to some or all of these subscribers based upon their associated information. This allows the service provider to send targeted advertisements to some of the subscribers and not others. For example, it may be more desirable to switch unicast streams to wealthy subscribers that include advertisements for expensive items because the advertisers are willing to pay more to target these wealthy subscribers. In this case, the incremental revenue value of placing the advertisements may also be a factor in the decision. The policy control may then allow advertisers willing to pay more to have preference and have streams containing their advertisements unicast before other unicast streams.

Similarly, policy controls at the ERM 204 may also be used to limit the percentage of free VOD within the allotted unicast bandwidth. This is beneficial when a total bandwidth utilization is over a threshold, or when the bandwidth allocated to unicast is over a threshold. In some embodiments, the ERM 204 prioritizes multicast delivery over unicast delivery.

In should be noted that both the SDVSM 202 and the ERM 204 may implement policy controls. The SDVSM 202 is STB and subscriber aware, therefore policies in these categories may be best suited for the SDVSM 202. On the other hand, the ERM 204 is subscriber unaware. However, the ERM 204 manages bandwidth for all applications sharing the same bandwidth pool. Cross application policies may be best suited for the ERM 204.

In one embodiment, network device 200 allocates streams based on the codec capabilities of a subscriber's STB 208. Some service providers only want to offer switched unicast services using more advanced video coding formats such as MPEG-4 part 10. However, service providers also consider the legacy equipment already out in the field, particularly the STBs 208 of older subscribers, in designing a suitable policy control function. Some older STBs 208 do not support more advanced video formats. Therefore, the SDVSM 202 can be used to ascertain the codec capabilities of the STBs 208 and allocate streams accordingly. Additionally, some STBs 208 do not support formats such as HD. In such situations, the SDVSM 202 switches to a unicast SD equivalent of the program instead of the HD version for a STB 208 that does not support HD. Alternatively, the SDVSM 202 may move STBs 208 not supporting HD to a switched multicast stream instead. Conversely, to reduce bandwidth requirements, the SDVSM 202 can switch multiple STBs 208 requesting the same HD version of a program a multicast stream. Additionally, there are some STBs 208 that do not include decoding features that support the dynamic stream synthesis for receiving switched unicast streams. resulting this case, the SDVSM 202 switches to multicast or broadcast streams for these STBs 208.

In particular embodiments, policy control also considers service differentiation. For example, the policy function can be designed such that subscribers to enhanced or premium packages receive switched unicast in HD (when bandwidth and other conditions permit) while subscribers to basic packages receive switched multicast in SD when requesting the same video program. Similarly, video programs associated with premium packages may have a higher priority for personalization, and hence may be more likely to be delivered as unicast streams than video programs associated with basic packages.

In one embodiment, the decision to provide a broadcast, multicast or unicast stream is made upon receipt of a channel request. Once the decision has been made and the network device 200 provides a stream to an STB 208, that stream is provided to the STB until another channel request is sent to the SDVSM 202 by that STB 208. For example, if the SDVSM 202 selects a unicast stream to an STB 208, the STB will continue to receive the unicast stream until a channel request is received or until the STB is turned off. In this case, even if a subscriber is receiving a unicast stream and bandwidth subsequently nears capacity, the SDVSM 202 will not switch from unicast to multicast during viewing. This avoids a potential disruption in service caused by switching from one stream to another. In other embodiments, decisions pertaining to stream selection are made on a temporal or periodic basis in addition to or alternatively to when a channel request is received. In another embodiment, as the total bandwidth capacity is neared or an overflow condition is reached, some or all of the viewers watching the same video programs are switched to multicast streams to regain efficiency and reduce bandwidth requirements. Furthermore, the temporary promotion of content from a unicast tier to a broadcast or multicast tier may be considered in policy controls to mitigate effects associated with short-term spikes in program demand.

Figure 3:
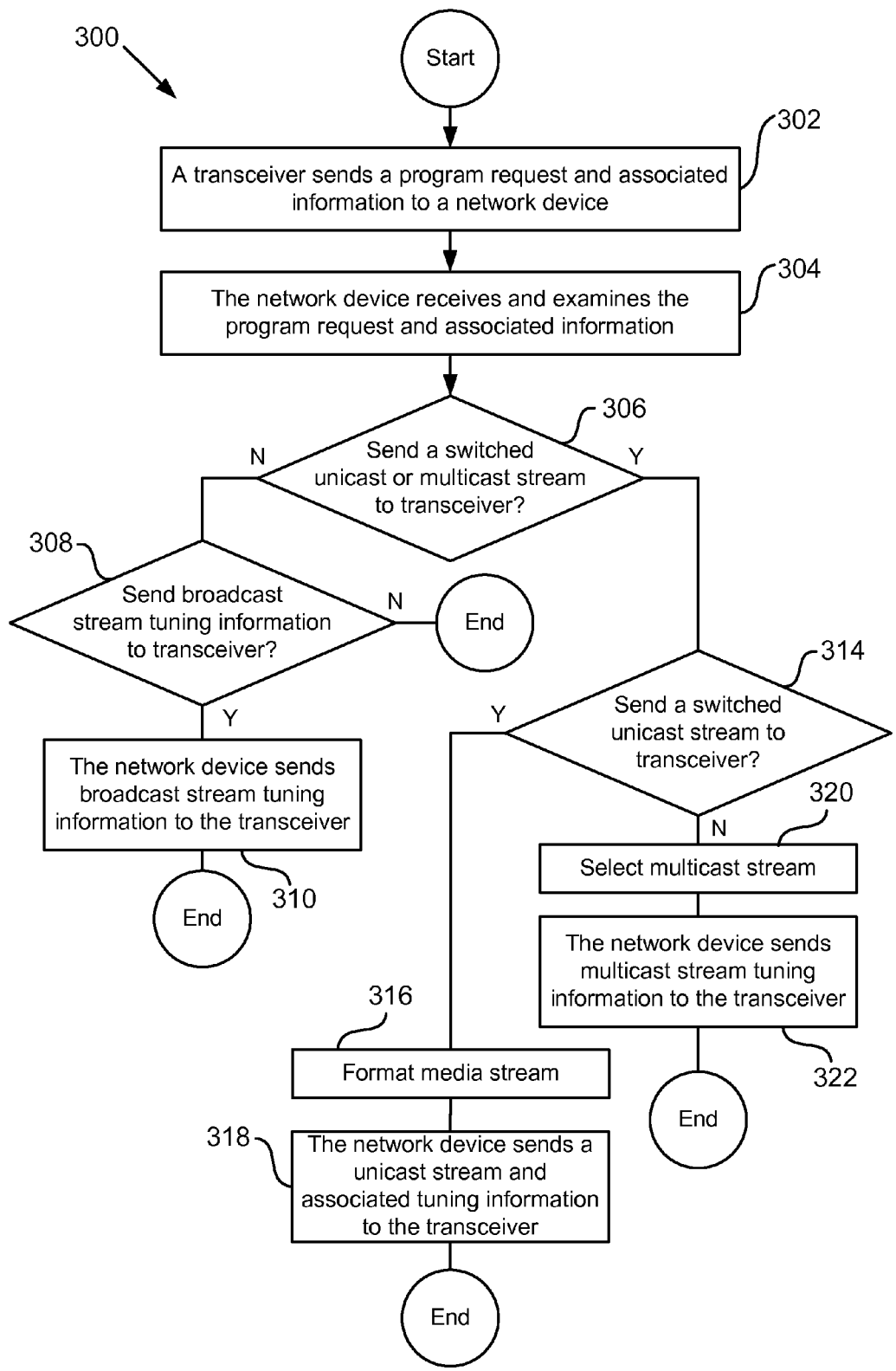
FIG. 3 illustrates an example process for providing a media stream in accordance with particular embodiments.

FIG. 3 illustrates a process 300 for providing a media stream to a transceiver in a switched video network having a multiplicity of transceivers served by a plurality of associated distribution hubs in accordance with one embodiment. The transceiver may be an STB or other tuner or decoder. At 302, the transceiver sends a program request (e.g., a video program request) to a network device located in an associated distribution hub. The transceiver and network device communicate via a channel within the switched video network. The network device is capable of determining the type of media stream to provide to the transceivers in an associated service group of transceivers served by the distribution hub. In one particular embodiment, the network device includes an SDVSM, ERM and QAM. In various embodiments, the program request is accompanied with other information that describes the subscriber and/or the transceiver's capabilities. The network device receives and examines the program request at 304.

At 306, the decision is made at the network device whether to switch a unicast or multicast stream (referred to as "switched" streams) to the transceiver or not in response to the program request. This decision is based upon a number of policy controls and associated variables. In particular embodiments, the policy controls utilize information received from the subscriber's transceiver. Some of the variables used in decision 306 may include: the current bandwidth available on the network through the channel, the percentage of bandwidth allocated to switched unicast and multicast streams, the percentage of the bandwidth allocated solely to unicast streams, the number of other subscribers receiving the desired program, the number of transceivers in the service group served by the distribution hub, the demographic profile of the subscriber initiating the program request, the level of income of the subscriber, the programs generally viewed by the subscriber, the current program requested by the subscriber, the popularity of the program requested by the subscriber, the format (e.g., HD or SD) of the program requested by the subscriber, the available formats of the program requested by the subscriber, the codec capabilities of the subscriber's transceiver, the time of day and the day of the week, among others.

In one particular embodiment, the policy control is based in part on the currently available bandwidth over the network. If the total bandwidth utilization is over a threshold, the network device does not switch a unicast or multicast stream to the transceiver. Additionally, the decision may also be based upon the desire to send targeted advertisements to the subscribers serviced by the distribution hub.

If it is determined that a unicast or multicast stream should not be sent to the transceiver, then the decision is then made at 308 whether or not to send the transceiver channel tuning information so that the transceiver can find and decode the desired program via a broadcast stream. If it is determined to send tuning information, then at 310, the transceiver is sent tuning information to tune to the broadcast stream. In one embodiment, if the desired program is not being broadcast over the network, the transceiver is not sent any information. Furthermore, the decision may simply be made not to send the transceiver any program tuning information regardless of whether or not the desired program is being broadcast over the network. Moreover, in another embodiment, decision 308 is not included at all in process 300; that is, process 300 ends if it is decided at 306 not to switch a unicast or multicast stream to the transceiver.

If, at 306, the decision is made to switch a unicast or multicast stream to the transceiver in response to the program request, then a decision is then made at 314 whether or not to switch a unicast stream to the transceiver. This decision is also based upon a number of policy controls and associated variables as described above with reference to decision 306. In one particular embodiment, the policy controls are designed to blend unicast and multicast switching over the network such that bandwidth is used to its fullest while providing as many unicast streams, and therefore individual subscriber targeted advertisements, as possible.

The policies and variables chosen may depend on a service provider's business needs. Additionally, as different policies or rules can produce different results (i.e., result in a different form of delivery to the transceiver), weights may be assigned to each policy rule or variable to generate a final decision. In one embodiment, some or all of these weights vary dynamically. For example, the weights can vary based upon the current network bandwidth usage. When the network is more utilized (e.g., there is relatively little available bandwidth and/or subscriber program request activity is relatively high), the cost of adding a unicast stream is increased (i.e., weighted more) in an accelerated fashion to favor multicast delivery instead.

If, at 314, a decision is made to switch a unicast stream to the transceiver, then at 316, the incoming media stream that includes the desired program is formatted as a unicast stream with a bitrate and resolution appropriate for the target transceiver. The unicast stream including the desired program is then output at 318 and provided to the target transceiver along with associated tuning information. If, at 314, the result of the decision is that a unicast stream will not be provided to the transceiver, then at 320, a multicast stream with a bitrate and resolution appropriate for the target transceiver is chosen. The multicast stream including the desired program is then output at 322 and provided to the target transceiver along with tuning information to tune to a multicast stream carrying the desired program.

In the embodiment illustrated in FIG. 3, a decision to provide a broadcast, multicast or unicast stream is made upon receipt of a channel request. In this case, once the relevant decisions have been made and assuming a selected stream is provided to the transceiver, process 300 ends until another program request is sent by the STB and received by the network device. Thus, even if a subscriber's STB is receiving a unicast stream and bandwidth is nearing capacity, the network device will not switch from unicast to multicast delivery during viewing. In other embodiments, decisions are made on a temporal or periodic basis in addition to or alternatively to when a program request is received. Alternatively, as the total bandwidth capacity is neared or an overflow condition is reached, process 300 switches viewers watching the same video programs multicast streams or provided tuning information to tune to broadcast streams to regain efficiency and reduce bandwidth requirements. Furthermore, the temporary demotion of content from a unicast to a broadcast or multicast tier may be considered in policy controls to mitigate effects associated with short-term spikes in program demand.

While the discussion to this point has focused on techniques for cable networks, the technology described in the foregoing embodiments is applicable to any access or shared-access network having a plurality of hosts or nodes which share at least one channel for communicating with at least one head end in the network. Examples of shared-access networks include, in addition to cable networks, wireless networks, Ethernet, FastEthernet, GigabitEthernet, LANs, DSL etc.

For example, in a DSL based network, while the bandwidth to an endpoint such as a home is not shared among other subscribers, the aggregation link is. More specifically, in a DSL network, a Digital Subscriber Line Access Multiplexer (DSLAM) connects multiple subscriber digital subscriber lines (DSLs) to a high-speed internet backbone data link using multiplexing techniques. The DSLAM routes voice traffic and DSL data from the internet backbone onto the subscriber's individual DSL lines. The DSLAM also receives and separates outgoing voice and DSL data signals, directing DSL data signals onto an appropriate network and voice data towards a voice switch. In a DSL network, each subscriber gets their own line out of the DSLAM and hence receives there own stream. However, the backbone link is often oversubscribed. That is, the bandwidth capacity of the backbone data link is less than the sum of the bandwidth capacity of all of the individual DSL links. Also, in a DSL network, a slightly different set of challenges are faced. The number of multicast IP addresses that some of the older DSLAMs support is less than 256. The decision is then whether to use one of the 256 IP multicast streams or use a unicast stream. As those of skill in the art will appreciate, many of the policy controls described above may be implemented for use in DSL networks as well.

The techniques and methods described herein may be implemented on various systems. For example, particular embodiments are implemented on routers and/or switches. In a specific embodiment, the systems may be specially configured routers such as, for example, specially configured router models 1600, 2500, 2600, 3600, 4500, 4700, 7200, 12000, 7600, CRS-1, and 7500 available from Cisco Technology, Inc. of San Jose, Calif. A general architecture for some of these machines will be given below. In an alternative embodiment, the methods of particular embodiments are implemented on a video streaming server, or a general-purpose network host machine such as a personal computer or workstation. Further, various embodiments may be at least partially implemented on a card (e.g., an interface card) for a network device or a general-purpose computing device.

Generally, the techniques described herein may be implemented on software and/or hardware. In a specific embodiment, the techniques may be implemented in software such as an operating system or in an application running on an operating system. A software or software/hardware hybrid system is preferably implemented on a general-purpose programmable machine. Such a programmable machine may be a network device designed to handle network traffic. Such network devices typically have multiple network interfaces. One important class of devices that may be used to implement particular embodiments is the Cable Modem Termination System.

Figure 4:
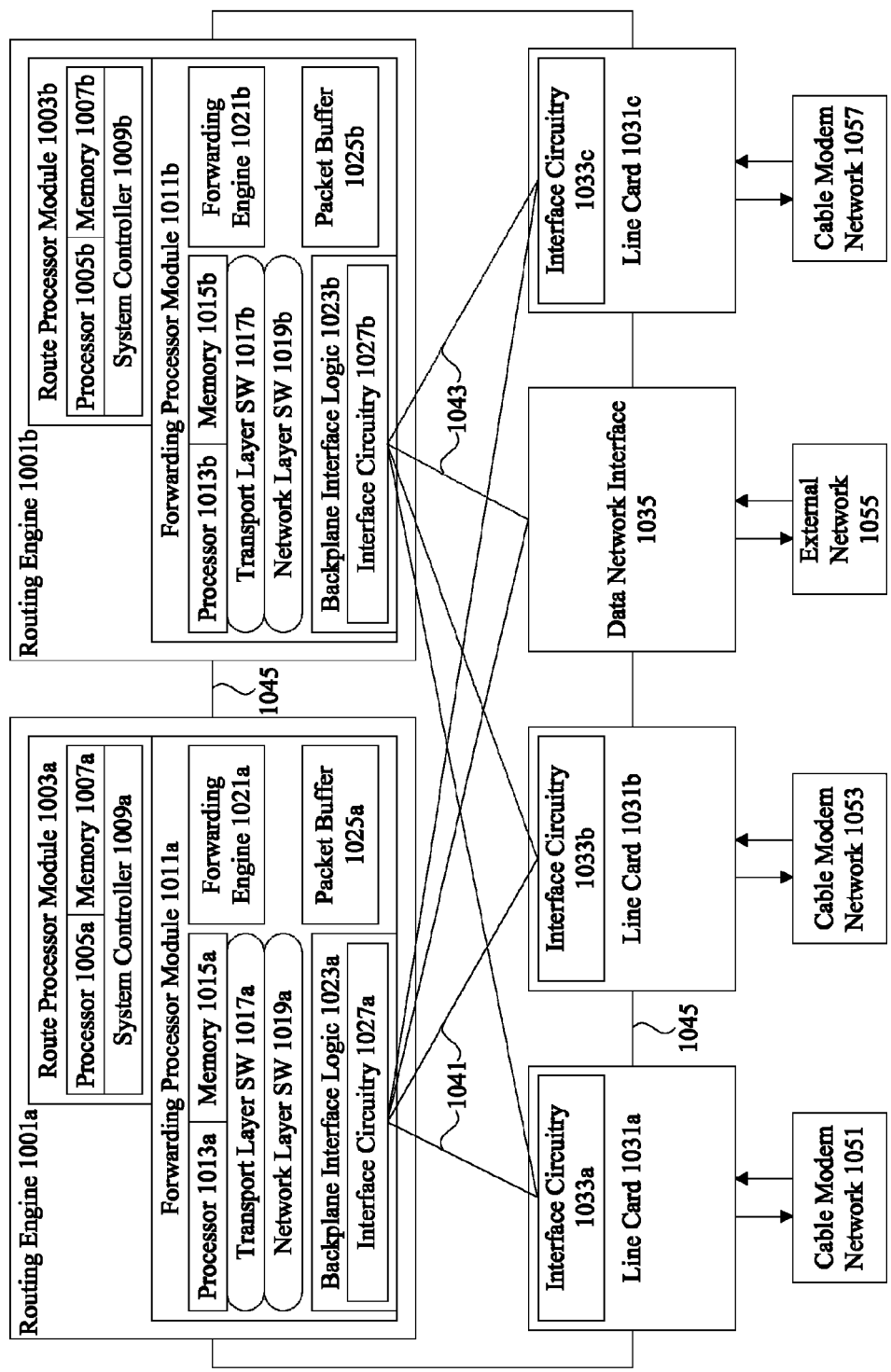
FIG. 4 illustrates a block diagram of an example embodiment of a Cable Modem Termination System (CMTS) which may be used to implement particular embodiments.

FIG. 4 shows a block diagram of a specific embodiment of a Cable Modem Termination System (CMTS) 1000 which may be used to implement certain embodiments. As shown in FIG. 4 the CMTS 1000 may comprise a plurality of routing engines (e.g. 1001a, 1001b).

Each of the routing engines may include a variety of similar modules and/or components. According to a specific embodiment, Routing Engine A may be configured or designed to include a plurality of functionally different modules or components, including, for example, a Forwarding Processor (FP) Module 1011a adapted to provide packet forwarding functionality; a Forwarding Engine 1021a; a Route Processor (RP) Module 1003a adapted to implement routing or forwarding operations; a utility component 1002a adapted to provide system clock and timestamp functionality; etc. The routing engine components provide may be configured to provide layer one, layer two, layer three and layer four functionality as well as quality of service (QoS) functionality.

According to a specific implementation, the RP Module 1003a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Technology, Inc. of San Jose, Calif. For example, as shown in the embodiment of FIG. 10, the RP Module 1003a comprises a general-purpose processor 1005a (e.g., a MIPS route processor) coupled to a system controller 1009a and memory 1007a.

The memory 1007a may comprise synchronous dynamic random access memory (SDRAM) storage locations addressable by the processor 1005a for storing software programs, video data, and data structures accessed by the components. A network routing operating system, portions of which may reside in memory and executed by the route processor, functionally organizes the router by invoking network operations in support of software processes executing on the router.

The RP processor 1005a may be configured to construct and load routing tables used by the FP Module 1011a. The processor 1005a may also be configured or designed to perform configuration management functions of the routing engine 1001a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Backplane Interface Logic 1023a including interface circuitry 1027a may be coupled to the respective interface circuitry 1033a, 1033b of line cards 1031a, 1031b. The line cards 1031a, 1031b, 1031c may be further coupled to Cable Modem Networks 1051, 1053, 1057, respectively. Similarly, Data Network Interface 1035 may be coupled to External Network 1055. According to various embodiments, the FP Module 1011 may comprise a processor 1013a and memory 1015a for handling transport layer 1017 and network layer 1019 functionality. The FP Module 1011a may also include a Packet Buffer 1025a, as shown. The FP Module 1011a may also be configured to provide transaction compacting functionality, data parcel tunneling functionality, video data transmission functionality, etc.

According to different embodiments, one or more of the routing engines may be configured to communicate with a plurality of line cards (e.g. 1031, 1035) via point-to-point links. For example, as shown in FIG. 4, each of the plurality of line cards 1031 and 1035 are connected to each of the routing engines 1001a, 1001b via point-to-point links 1041 and 1043. One advantage of the point-to-point link configuration is that it provides additional reliability in that the failure of one or more line cards will not interfere with communications between other line cards and the routing engine(s). For example, if Line Card A 1031a suddenly failed, each of the routing engines would still be able to communicate with the other line cards.

Regardless of the network device's configuration, it may employ one or more memories or memory modules (e.g., memory 1007a, 1015a, etc.) configured to store video data, program instructions for the network operations and other functions of particular embodiments described herein. The program instructions may specify an operating system and one or more applications, for example. Such memory or memories may also be configured to store data structures, video data, or other specific non-program information described herein.

Because such information and program instructions may be employed to implement the systems/methods described herein, the described embodiments also relate to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

In general, the methods and apparatus described above may be implemented on a traffic handling device (e.g., a switch or router) for providing capability in a network having at least one traffic handling device (e.g., another switch or router) that provides normal service to a host.

Although the foregoing embodiments have been described in some detail for purposes of clarity of understanding, it will be apparent that certain changes and modifications may be practiced within the scope of the appended claims. Therefore, the described embodiments should be taken as illustrative and not restrictive, and the described embodiments should not be limited to the details given herein but should be defined by the following claims and their full scope of equivalents.

What is claimed is:

1. A method comprising:
   receiving by a network device a program request from a transceiver that includes a program request to receive a video program at the transceiver, wherein the transceiver is associated with a subscriber;
   ascertaining by the network device an amount of bandwidth on a network channel available to the transceiver and all other transceivers being serviced by the network device via the network channel, the network device being connected to the network channel;
   determining by the network device whether to provide a unicast stream or a multicast stream to deliver the requested video program to the transceiver in response to the program request based on a result obtained after implementing a policy control function that considers the amount of bandwidth on the network channel available to the transceiver and all other transceivers serviced by the network device via the network channel, capabilities of the transceiver, and a subscriber profile of the subscriber, wherein the transceiver and all other transceivers served by the network device via the network channel are directly connected to the network channel;
   selecting a format and encoding type of a program offering of an incoming media stream by the network device in accordance with the capabilities of the transceiver and with the result of the policy control function to provide a corresponding formatted unicast or multicast media stream that includes video data for the requested video program; and
   outputting by the network device the associated formatted unicast or multicast media stream on the network channel.

2. The method as recited in claim 1, wherein the policy control function is implemented by the network device at a distribution hub which provides program service via the network channel to the transceiver and to the other transceivers serviced by the network device via the network channel.

3. The method as recited in claim 2, wherein the program request further includes information that describes the associated subscriber, and wherein the policy control function utilizes the information describing the associated subscriber such that determining whether to provide a unicast stream or a multicast stream is performed based, at least in part, upon the information describing the associated subscriber.

4. The method as recited in claim 1, wherein the program request further includes information that describes the associated subscriber.

5. The method as recited in claim 1, wherein the policy control function utilizes information including one of:
   a demographic profile of the associated subscriber, a level of income of the associated subscriber, or programs generally requested by the transceiver.

6. The method as recited in claim 1, wherein the policy control function utilizes information comprising:
   an average rate of program requests sent by transceivers in a specified period of time.

7. The method as recited in claim 1, wherein the policy control function utilizes information including one of:
   a resolution format of the program requested by the transceiver or available formats of the program requested by the transceiver.

8. The method as recited in claim 1, further comprising maximizing the number of unicast streams sent to transceivers while maintaining the amount of bandwidth on the network channel at a threshold level.

9. The method as recited in claim 1, wherein the policy control function utilizes information including one of:
a percentage of bandwidth used on the network channel that is allocated to switched unicast and multicast streams, or a percentage of bandwidth used on the network channel that is allocated solely to unicast streams.

10. The method as recited in claim 1, further comprising comparing the amount of bandwidth on the network channel to a threshold and
providing a unicast stream to the transceiver if the amount of bandwidth is less than the threshold, and
providing a multicast stream to the transceiver if the amount of bandwidth is greater than the threshold.

11. The method as recited in claim 1, further comprising determining the decoding capabilities of the transceiver and selecting a coding format for a unicast or multicast stream based on compression ratio.

12. The method as recited in claim 1, further comprising determining the resolution formats that the transceiver is able to decode and selecting a coding format for a unicast or multicast stream based on resolution.

13. The method as recited in claim 1, wherein the decision whether to provide a unicast stream or a multicast stream is made upon receipt of a program request.

14. The method as recited in claim 1, wherein the network channel is not dedicated to the transceiver.

15. The method as recited in claim 1, wherein the network channel has a limited bandwidth that is unrelated to capabilities of the transceiver.

16. The method as recited in claim 1, wherein the network device is a head end.

17. The method as recited in claim 1, wherein the subscriber profile indicates services to be provided to the subscriber.

18. The method as recited in claim 17, wherein the services include unicast or multicast.

19. The method as recited in claim 17, wherein the services and the format include high definition or standard definition.

20. The method as recited in claim 1, wherein the subscriber profile indicates a priority.

21. The method as recited in claim 20, wherein the priority pertains to personalization or delivery of unicast.

22. The method as recited in claim 1, wherein the format includes high definition or standard definition.

23. An apparatus comprising:
a first network interface configured to receive an incoming media stream that includes video data for a video program;
at least one processor configured to execute instructions encoded in one or more tangible media for execution and when executed operable to
examine a program request received from a transceiver that includes a program request to receive the video program at the transceiver, wherein the transceiver is associated with a subscriber;
determine an amount of bandwidth on a network channel available to the transceiver and all other transceivers serviced by the apparatus via the network channel, the apparatus being connected to the network channel;
determine whether to provide a unicast stream or a multicast stream to deliver the requested video program to the transceiver in response to the program request based on a result obtained after implementing a policy control function that considers the amount of bandwidth on the network channel, capabilities of the transceiver, and a subscriber profile of the subscriber, wherein the transceiver and all other transceivers served by the apparatus via the network channel are directly connected to the network channel; and
select a format and encoding type of a program offering of the incoming media stream in accordance with the capabilities of the transceiver and with the result of the policy control function to provide a corresponding formatted unicast or multicast media stream that includes video data for the video program; and
one or more network interfaces configured to receive the program request from the transceiver over the network channel, and output the associated formatted unicast or multicast media stream on the network channel.

24. The apparatus as recited in claim 23, wherein the apparatus is a network device at a distribution hub which provides program service to the transceiver and to the other transceivers serviced by the apparatus via the network channel, and wherein the program request further includes information that describes the transceiver and associated subscriber.

25. The apparatus as recited in claim 23, wherein the policy control function utilizes information including one of:
a demographic profile of the associated subscriber, a level of income of the associated subscriber, or programs generally requested by the transceiver.

26. The apparatus as recited in claim 23, wherein the policy control function utilizes information comprising:
an average rate of program requests sent by transceivers in a specified period of time.

27. The apparatus as recited in claim 23, wherein the policy control function utilizes information including one of:
a resolution format of the program requested by the transceiver or available formats of the program requested by the transceiver.

28. The apparatus as recited in claim 23, wherein the policy control function utilizes information including one of:
a percentage of a bandwidth used on the network channel that is allocated to switched unicast and multicast streams, or a percentage of a bandwidth used on the network channel that is allocated solely to unicast streams.

29. The apparatus as recited in claim 23 wherein the instructions for implementing the policy control function are in a policy control server in communication with the processor.

30. One or more non-transitory computer-readable media storing thereon computer-readable instructions operable to:
receive a program request by a network device from a transceiver that includes a program request to receive a video program at the transceiver, wherein the transceiver is associated with a subscriber;
determine by the network device an amount of bandwidth on a network channel available to the transceiver and all other transceivers serviced by the network device via the network channel, the network device being connected to the network channel; and
determine by the network device whether to provide a unicast stream or a multicast stream to deliver the requested video program to the transceiver in response to the program request based on a result obtained after implementing a policy control function that considers the amount of bandwidth on the network channel, capabilities of the transceiver, and a subscriber profile of the subscriber, wherein the transceiver and all other transceivers served by the network device via the network channel are directly connected to the network channel;

select a format and encoding type of a program offering of an incoming media stream by the network device in accordance with the capabilities of the transceiver and with the result of the policy control function to provide a corresponding formatted unicast or multicast media stream that includes video data for the requested video program; and output the associated formatted unicast or multicast media stream by the network device on the network channel.

\* \* \* \* \*